Sept. 2, 1952  K. VON KOKERITZ ET AL  2,609,175
CHECK-VALVE
Filed May 2, 1945  2 SHEETS—SHEET 1
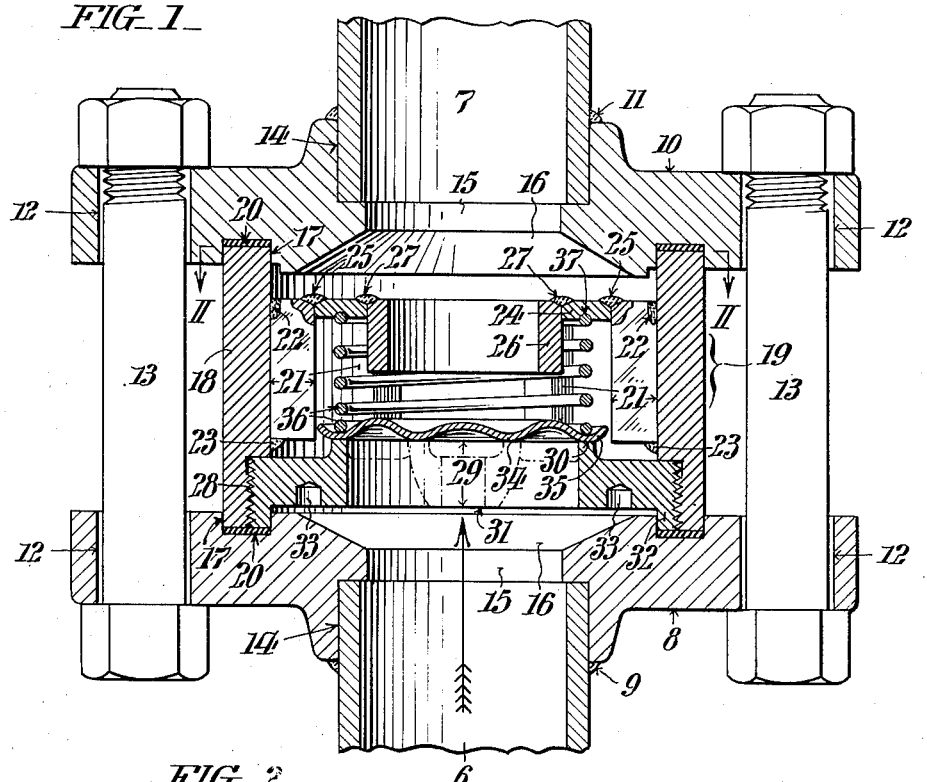
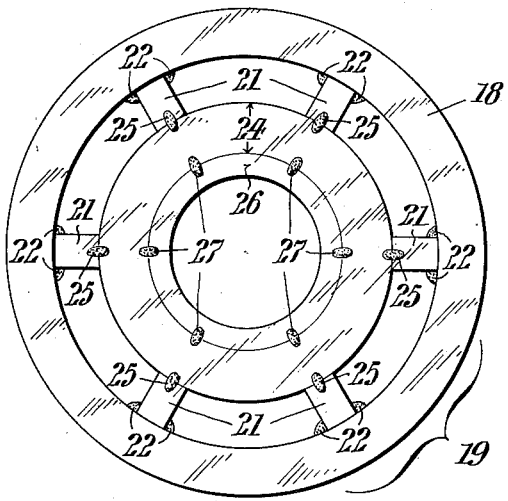
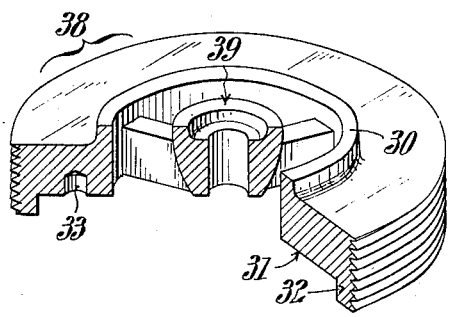
WITNESSES
Hubert Fuchs
Thomas W. Kerr, Jr.
INVENTORS:
Karl von Kokeritz, Raymond H. Blackford &
Bernard L. Schwaller,
BY Paul & Paul
ATTORNEYS.

Sept. 2, 1952 K. VON KOKERITZ ET AL 2,609,175
CHECK-VALVE
Filed May 2, 1945 2 SHEETS—SHEET 2
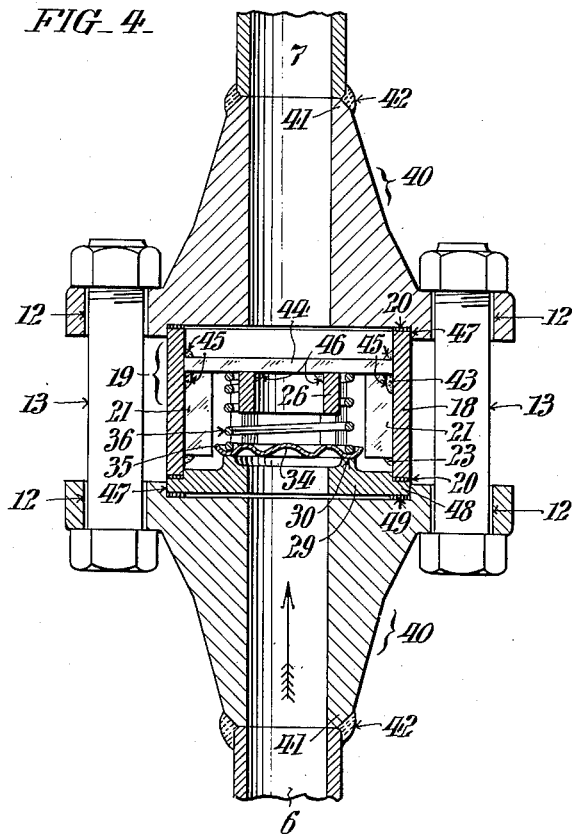
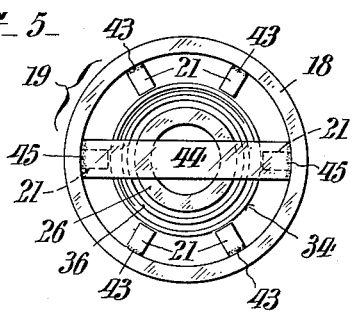
WITNESSES
Hubert Fuchs
Thomas W. Kerr Jr.
INVENTORS:
Karl von Kokeritz, Raymond H. Blackford &
Bernard L. Schwaller;
BY Paul & Paul
ATTORNEYS.

Patented Sept. 2, 1952

2,609,175

UNITED STATES PATENT OFFICE 2,609,175

CHECK VALVE

Karl von Kokeritz, Staten Island, and Raymond H. Blackford, Long Beach, N. Y., and Bernard L. Schwaller, Wayne, Pa., assignors to Durabla Manufacturing Company, New York, N. Y., a corporation of New York Application May 2, 1945, Serial No. 591,532

3 Claims. (Cl. 251—144)

This invention relates to check-valves and more particularly to the species designed for interposition between the confronting ends of aligned conduit or pipes for controlling flow therethrough in one direction only.

Check-valves of the type referred to as heretofore constructed while answering the purpose for which they are designed have been difficult to remove when needing repair or replacement without distorting or dismantling the immediately connected conduit or pipe length.

The primary object of this invention is to provide a novel form of check-valve which is capable of quick and/or easy placement or removal with all of its components, as a unit, without disconnecting or removing any length of the line proper in which it is interposed.

Another object is to furnish an improved check-valve which can be quickly removed and replaced by the simple expedient of loosening the conventional means normally holding together the confronting end flanges of aligned conduit or pipe.

A further object of this invention is to provide a straight-line flow type of check-valve, preferably constructed as a welded assembly, whereby the cost of production of such valve is considerably reduced; said novel check-valve being of superior quality incidental to the inclusion therein of solid, homogeneous drawn and forged metal parts, as contrasted with the prior use of castings which are not infrequently porous and deformed incidental to uneven shrinkage, and so forth.

A still further object is the provision of a no-leak check-valve comprising but few parts and constituting, when assembled, a self-contained unit which can be fitted in active position, or removed, with a minimum expenditure of time and labor.

While the foregoing definitions are indicative in a general way of the aims of this invention, other objects with ancillary advantages will be evident to those skilled in the art upon a full understanding of the construction, arrangement and operation of the means hereinafter fully disclosed; but it will also be appreciated that this invention is susceptible of other embodiments or structurally modified forms coming equally within the terms and scope of the concluding claims.

In the accompanying drawings:

Fig. 1 is a central longitudinal section through a pipe line connection in which is interposed a preferred embodiment of the novel check-valve constructed in accordance with this invention.

Fig. 2 is a top plan view of the check-valve as an assembled unit.

Fig. 3 is a part sectional fragmentary perspective view of a modified form of seat component, the same being hereinafter full explained.

Fig. 4 is a sectional view similar to Fig. 1 showing a modified form of check-valve, and Fig. 5 is a plan view of the check-valve shown in Fig. 4.

In the following detailed description of the embodiments of this invention shown by the above identified drawings, specific terms will be employed for the sake of clarity, but it is to be understood that such terms are used in a descriptive sense and not for purposes of limitation; each such term being intended to include all technical equivalents which cooperate in a similar manner to accomplish an analogous objective.

Referring more in detail first to Figs. 1 and 2, the reference numerals 6, 7 respectively designate inlet and discharge metal pipe ends, the former of which 6 is fitted with a socket-type flange 8 appropriately secured thereto by a surrounding weld 9, whereas the latter 7 has a similar flange 10 likewise integrated thereto by a corresponding weld 11. Both of the flanges 8 and 10 are provided with circumferentially spaced apertures 12 for passage of clamp bolts 13, whereby connection of the respective pipe ends is effected, as later on again referred to.

Each flange 8, 10 is formed with a socket 14 of a diameter to snugly fit the end portion of the respective pipe 6, 7; a bore 15 and a flare 16; as well as a concentric groove 17 in the confronting faces for reception of the respective ends of the cylindrical wall 18 of the check-valve comprehensively designated 19, with interposition of suitable sealing gaskets 20.

The cylindrical wall 18 of the check-valve 19 is, preferably, severed from seamless steel tubing of appropriate diameter and thickness, and cut to the desired length for seating in the line connection flange-grooves 17, as readily understood from Fig. 1. Circumferentially spaced around the bore of the check-valve wall or cage 18 are a series of radial and longitudinally directed guide elements 21 conveniently although not essentially cut to the desired length from steel bar or similar stock, and said guide elements 21 are fixed to the wall 18 by upper and lower welds 22, 23. The valve wall 18 is further fitted with a concentric spacer-ring 24 co-planar with the upper ends of the guide elements 21 and secured thereto by welds 25; and said ring 24, in turn, affording support for a tubular section stop-means 26 which is permanently attached in position by welds 27, all as readily seen and appreciated from Figs. 1 and 2.

The lower end of the check-valve or cage wall 18 is conveniently counter-bored and screw-threaded at 28 for reception of a circumferentially threaded annular member 29, of seamless steel, embodying a seat 30, and said annular member 29 is recessed at 31 so as to provide a surrounding section or lip 32 which, when the member 29 is fitted in position, forms an extension of the wall 18 for seating in the adjoining groove 17 of the flange 8, all as clearly shown in Fig. 1. At this juncture particular attention is directed to the fact that the lower gasket 20 not only covers the end of the cylindrical wall 18 but also the threadedly engaged annular end of the ported seat member 29, whereby the screw-threaded joint as well as both of said parts are positively sealed against leakage from within the valve, as well as surrounding atmospheric action from without. In addition the annular member 29 may be provided with socket holes 33 for application of a suitable tool whereby said member can be easily inserted or removed in an obvious manner. Coactive with the seat 30 aforesaid is a valve disc 34, preferably of the undulate cross-section shown and having a surrounding lip 35 in which seats the lower end of a coil-spring 36 in compression. The upper end of coil-spring 36 preferably engages in a concentric groove 37, provided for the purpose in the underside of the spacer-ring 24 hereinbefore described.

At this juncture it is to be noted that while the annular or seat member 29 has been shown and described as having screw-thread engagement in the valve cage 18 for ease in assembly of the valve 19, or removal, it is to be distinctly understood such form of connection is not limitative; inasmuch as the seat member 29 may be made a "sliding" or a "drive" fit, or even a taper-fit as found desirable or expedient. Furthermore, the seat-member may be of the generally termed "ported" type 38 shown in Fig. 3, so as to provide a center support 39 for the valve disc 34 as indicated in dot-and-dash outline in Fig. 1.

Referring now to the modified form of this invention shown by Figs. 4 and 5 of the drawings, all parts having equivalents in the preceding description will be correspondingly designated by like reference characters, in order to obviate unnecessary repetitive explanation. It will be observed, however, that the previously described pipe coupling connections are substituted by what are known in the art as welding neck-flanges 40, to the reduced ends 41 whereof the pipe ends 6, 7 are abuttingly seam-welded at 42. The radial guide elements 21 in this form of the invention are conveniently secured to the cage wall by lower and upper abutment welds 23, 43 respectively; while the spacer-ring 24 is dispensed with and use made of a diameter bar 44, integrated on top of opposed elements 21 by welds 45; and to said bar 44 the stop means 26 is fixedly attached by welds 46, all as readily understandable by those conversant with the art. A still further difference in this form of the invention is concerned with the provision of a shallow recess 47 in each of the confronting faces of the neck-flanges 40, into the upper of which the cage wall 18 seats with interposition of a suitable sealing gasket 20; whereas the lower end of said cage walls seats on a shouldered reduction 48 and gasket 20 circumferentially of the annular seat member 29; while the latter seats in the recess 47 of the lower neck-flange 40 with an intervening gasket 49 whereby the check-valve 19 is rendered much more easy of assembly and removal for purposes of repair or replacement.

In the operation of the improved check-valves 19 of this invention it will be readily understood that as the liquid or vapor enters by way of the pipe 6, as indicated by the arrows in Figs. 1 and 4, it exerts pressure against the underside of the valve disc 34, and lifts the latter from its seat 30 in opposition to the spring 36 in compression, thereby opening the valve 19 for passage of the liquid or vapor therethrough to the pipe 7 with an almost unrestricted straight-line teardrop-flow action between the radial guide elements 21, and thence onward through said pipe 7 to discharge, or otherwise. Upon cessation of the flow the valve disc 34 will automatically close to the seat 30 aided by the reactive force of the spring 36 and any back-pressure in the pipe line 7.

From the foregoing it will be apparent that the force of the spring 36, its gauge as well as that of the valve disc 34, can be varied to suit differing service conditions without interfering with the sensitivity or responsiveness required by specific service needs. Furthermore the valves 19 may be made of numerous sizes for use in pipe lines of different diameters or wherever a check-valve is required; while it will be self-evident that such valves of the smaller sizes may be arranged in group formation with considerable advantage over a single large unit; while extensive tests have proven that the valve discs 34 when not activated sit tight to the seats 30, 29; or they will not "cant" and cause leakage therepast. In other words, check-valves of the hereinbefore typified species have proven to be positive in action under diverse test conditions, while they are more durable and less liable to get out of order than analogous types of such valves; whereas the manner of gasketing the valve by the elements 20 and 49 effectively seals the valve body or cage 18 as well as the port through the annular seat member 29, against leakage or atmospheric action.

Having thus described our invention, we claim:

1. A check valve for a fluid comprising a housing having a substantially cylindrical inner face, said housing having an inlet and an outlet for fluid, a ported valve seat base mounted in said housing adjacent to the inlet thereof, a valve seat on said base, a plurality of spaced-apart bar elements each extending longitudinally along the inner face of said housing and forming longitudinally-extending channels therebetween, a ring fixed to the inner faces of said bar elements near the outlet of said housing, the outer face of said ring coacting with the inner face of said housing to form passages near the ends of said channels through which fluid may pass, a stop element having a cylindrical surface fixed within said ring, a valve disc having a curved outer portion movable longitudinally in said housing intermediate said stop element and said valve seat, and reactive means in the form of a helical spring mounted in said housing continuously urging said disc toward said seat, said disc having a diameter substantially equal to the diameter of said ring whereby the outer edge of the valve disc is adjacent to the inner edges of said bar elements and the inflowing fluid is thereby caused to flow through the longitudinally extending channels between said spaced-apart bar elements, and said helical spring being substantially in alignment with said valve seat and with the curved outer portion of said valve disc.

2. The check valve defined in claim 1 wherein said stop element is in the form of a tube extending longitudinally within said helical spring.

3. The check valve defined in claim 1 wherein said housing is counterbored, and said valve seat is removably attachable within said counterbore.

KARL von KOKERITZ.
RAYMOND H. BLACKFORD.
BERNARD L. SCHWALLER.

REFERENCES CITED

The following references are of record in the file of this patent:

UNITED STATES PATENTS

| Number | Name | Date |
|---|---|---|
| 383,428 | Messinger | May 22, 1888 |
| 395,044 | Farnsworth | Dec. 25, 1888 |
| 818,670 | Dumbolton | Apr. 24, 1906 |
| 1,222,154 | Smolensky | Apr. 10, 1917 |
| 1,297,930 | Temple | Mar. 18, 1919 |
| 1,608,178 | Loftin | Nov. 23, 1926 |
| 1,892,649 | Buenger | Dec. 27, 1932 |
| 1,900,736 | Richardson | Mar. 7, 1933 |
| 1,935,329 | Needham | Nov. 14, 1933 |
| 1,993,567 | Richardson | Mar. 5, 1935 |
| 2,034,418 | Plant | Mar. 17, 1936 |
| 2,117,389 | Yoder | May 17, 1938 |
| 2,137,402 | Hoferer | Nov. 22, 1938 |
| 2,143,399 | Abercrombie | Jan. 10, 1939 |
| 2,223,944 | Roy | Dec. 3, 1940 |